US008516013B2

United States Patent
Geller

(10) Patent No.: US 8,516,013 B2
(45) Date of Patent: Aug. 20, 2013

(54) SYSTEMS AND METHODS FOR SUBTEXT SEARCHING DATA USING SYNONYM-ENRICHED PREDICATIVE PHRASES AND SUBSTITUTED PRONOUNS

(76) Inventor: Ilya Geller, Brooklyn, NY (US)

( * ) Notice: Subject to any disclaimer, the term of this patent is extended or adjusted under 35 U.S.C. 154(b) by 0 days.

(21) Appl. No.: 13/396,344

(22) Filed: Feb. 14, 2012

(65) Prior Publication Data

US 2012/0150894 A1 Jun. 14, 2012

Related U.S. Application Data

(63) Continuation-in-part of application No. 12/878,675, filed on Sep. 9, 2010, now Pat. No. 8,447,789, which is a continuation-in-part of application No. 12/714,980, filed on Mar. 1, 2010, application No. 13/396,344, which is a continuation-in-part of application No. 13/324,192, filed on Dec. 13, 2011.

(60) Provisional application No. 61/443,875, filed on Feb. 17, 2011, provisional application No. 61/242,631, filed on Sep. 15, 2009, provisional application No. 61/156,999, filed on Mar. 3, 2009, provisional application No. 61/433,875, filed on Jan. 18, 2011.

(51) Int. Cl.
*G06F 17/30* (2006.01)

(52) U.S. Cl.
USPC ........... 707/804; 707/706; 707/736; 707/758; 707/802; 706/11; 706/15

(58) Field of Classification Search
None
See application file for complete search history.

(56) References Cited

U.S. PATENT DOCUMENTS

| | | | |
|---|---|---|---|
| 6,199,067 B1 | 3/2001 | Geller | |
| 6,205,456 B1 | 3/2001 | Nakao | |
| 7,120,574 B2 | 10/2006 | Troyanova et al. | |
| 7,756,847 B2 | 7/2010 | Pauws et al. | |
| 7,779,347 B2 | 8/2010 | Christiansen et al. | |
| 8,145,632 B2 * | 3/2012 | Dexter et al. | 707/722 |
| 2005/0108001 A1 | 5/2005 | Aarskog | |
| 2006/0047651 A1 | 3/2006 | Milic-Frayling et al. | |
| 2006/0143175 A1 | 6/2006 | Ukrainczyk et al. | |
| 2006/0242564 A1 * | 10/2006 | Egger et al. | 715/513 |
| 2006/0248068 A1 * | 11/2006 | Chien et al. | 707/4 |
| 2007/0011154 A1 | 1/2007 | Musgrove et al. | |
| 2007/0073745 A1 * | 3/2007 | Scott et al. | 707/100 |
| 2008/0059187 A1 * | 3/2008 | Roitblat et al. | 704/257 |
| 2008/0263033 A1 * | 10/2008 | Vailaya et al. | 707/6 |
| 2009/0144609 A1 | 6/2009 | Liang et al. | |

(Continued)

OTHER PUBLICATIONS

Ahonen et al, "Discovery of Reasonably-sized Fragments Using Inter-paragraph Similarities", 2007.*
Higgins et al, "Sentence Simmilarity messures for essay coherence", 2007.*
Hua Bolin, "Knowledge Extraction Based on Sentence Matching and Analyzing", 2008 International Sypmposium on Knowledge Acquisition and Modeling, Dec. 21-22, 2008, pp. 122-126.

*Primary Examiner* — Hung Le
(74) *Attorney, Agent, or Firm* — Cooper & Dunham LLP

(57) ABSTRACT

A method and system for automatically, without the necessity of user intervention, creating subtext from textual information regarding text and/or images and/or symbols, etc. and using the subtext to associate by sense passages of the textual information with each other and/or with passages related to search queries.

17 Claims, 1 Drawing Sheet

(56) References Cited

U.S. PATENT DOCUMENTS

| | | | |
|---|---|---|---|
| 2009/0198671 A1 | 8/2009 | Zhang et al. | |
| 2009/0276420 A1* | 11/2009 | Qiu | 707/5 |
| 2009/0306967 A1* | 12/2009 | Nicolov et al. | 704/9 |
| 2010/0005081 A1* | 1/2010 | Bennett | 707/4 |
| 2010/0131498 A1* | 5/2010 | Linthicum et al. | 707/722 |
| 2010/0228756 A1 | 9/2010 | Geller | |
| 2011/0040733 A1 | 2/2011 | Sercinoglu et al. | |
| 2011/0066659 A1 | 3/2011 | Geller | |
| 2012/0150894 A1 | 6/2012 | Geller | |
| 2012/0185501 A1 | 7/2012 | Geller | |

* cited by examiner

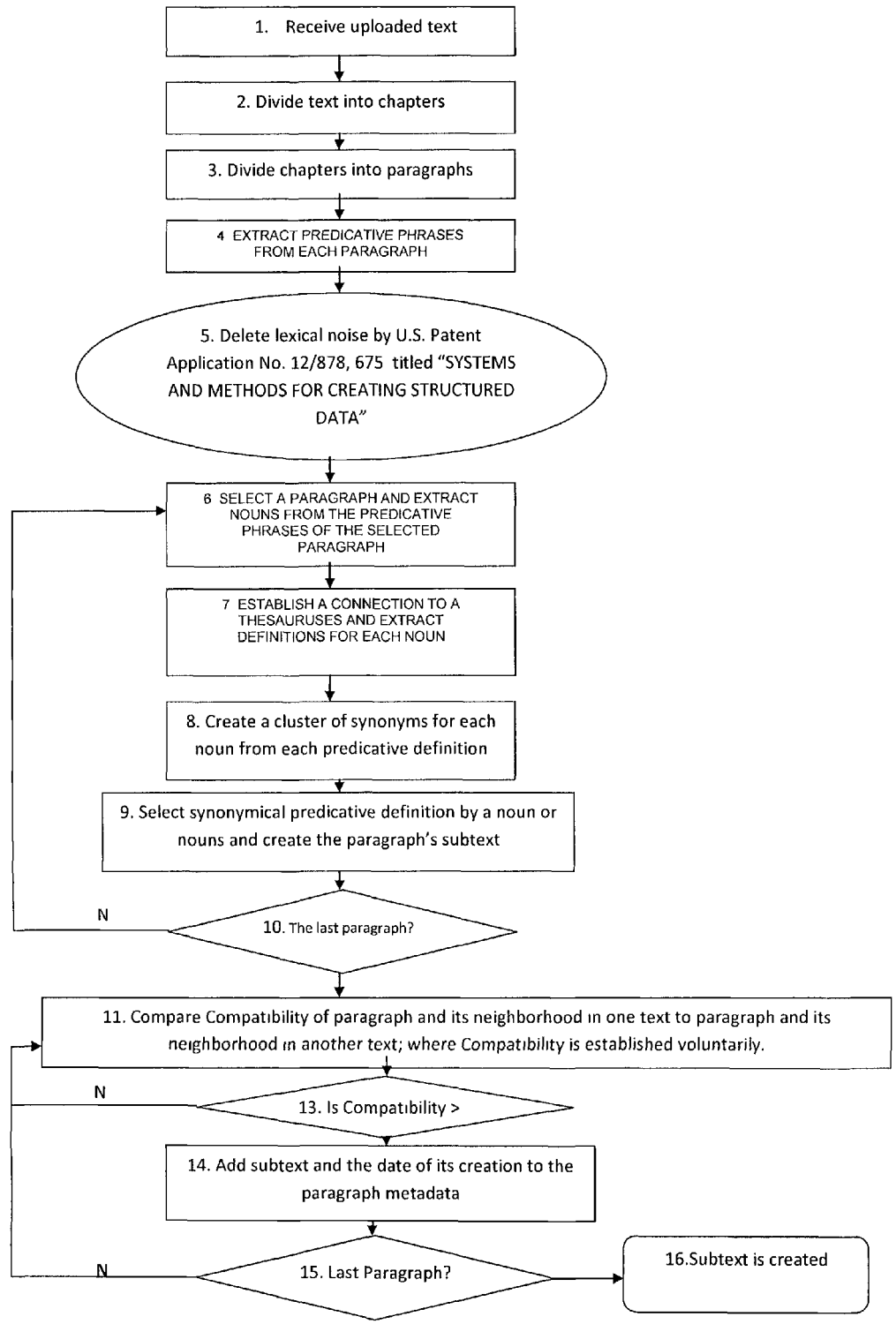

SYSTEMS AND METHODS FOR SUBTEXT SEARCHING DATA USING SYNONYM-ENRICHED PREDICATIVE PHRASES AND SUBSTITUTED PRONOUNS

REFERENCE TO RELATED APPLICATION

This patent application claims the benefit of the filing date of provisional patent application 61/443,875, which was filed on Feb. 15, 2011 and includes as an appendix provisional application 61/433,875 filed on Jan. 18, 2011 and thus physically incorporates the disclosure of said provisional application 61/433,875. In addition, this patent application is a continuation-in-part and claims the benefit of the filing dates of (a) utility application Ser. No. 12/878,675 filed Sep. 9, 2010 and claiming the benefit of provisional application 61/242,631 filed Sep. 15, 2009, (b) utility application Ser. No. 12/714,980 filed Mar. 1, 2010 and claiming the benefit of provisional application 61/156,999 filed Mar. 3, 2009, and (c) utility application Ser. No. 13/324,192 filed on Dec. 13, 2011 and claiming the benefit of said application Ser. Nos. 12/878,675 and 12/714,980 and said provisional application 61/433,875. This application also is related to U.S. Pat. No. 6,199,067. This application incorporates by reference the entirety of the applications and patent identified in this paragraph.

FIELD

This patent application is directed to digital information processing and more specifically to a system and a method for efficiently searching data to associate one text with another text by their subtexts. The principles disclosed in this application can be extended to include material in addition to or instead of text such as, without limitation, non-textual symbols and images.

BACKGROUND

The ability to quickly search and find relevant information in a great amount of possibly unrelated or superfluous information is of increasing importance as the universe of information that can accessed by computer continues to increase dramatically. A search query can generate results that may obscure the actually desired information in a mountain of other material, some or which may be less relevant, or not relevant at all, or nonsensical, even when the information resulting from the search or match attempt actually corresponds to the explicit wording of a search query. And, the results of a search or an attempt to match may not even include the information that is actually desired.

In more general terms, when a goal is to match one textual item or collection of items of textual information with another item or collection of items of information, the result may not be sufficiently specific in that the result may include too many matches that are not truly relevant and/or may omit matches that actually are relevant and desired. Internet searches are a prime and common example but the problem is glaring in many other fields.

One approach to seeking a working solution to that problem is described in said U.S. Pat. No. 6,199,067 incorporated by reference, and involves the use of particular linguistic patterns and their frequency of occurrence, extracted from textual passages provided by a user (in addition to the words of a search query) and stored in a user profile data file representative of the user's overall linguistic patterns and the frequencies of occurrence thereof.

The term "frequency of occurrence" corresponds in meaning to the term "weight" regarding predicative phrases, as used in patent application Ser. No. 12/878,675 filed Sep. 9, 2010 and Ser. No. 13/324,192 filed on Dec. 13, 2011, both incorporated by reference in this patent specification.

These linguistic patterns are stored in a computer-implemented user profile data file representative of the user's overall linguistic patterns and the frequencies of occurrence thereof; where the term linguistic patterns refers to the predicative definitions and predicative phrases of the type discussed in this patent specification.

A passage in this context can be any suitable amount of text that can be treated as a paragraph, and may actually be a paragraph.

A paragraph can be a subdivision of a written composition that comprises one or more sentences, deals with one or more points/ideas, or gives the words of one speaker by way of example, and can be extracted from text based upon textual indicators such as, for example, a hard return or a tab, although other suitable means, or indicators or algorithms can be used.

Documents that the user may search are in a database, or retrievable in an Internet, and are likewise analyzed and their linguistic patterns and pattern frequencies are also extracted and stored in corresponding document profiles.

More recently, a system and a method have been developed to eliminate or at least significantly reduce lexical noise, as described in said application Ser. No. 12/878,675, which is incorporated by reference. When a user initiates a search for particular data, linguistic patterns are also extracted from the search string, lexical noise is typically similarly eliminated or at least reduced significantly from the search string's linguistic patterns, and the linguistic patterns remaining after such processing are placed in a search profile.

The documents from the database are retrieved and the user profile is then cross-matched with the found document profiles to determine the degree of match based on summation of respective frequencies of occurrence of the matching patterns. The documents with document profiles having the highest degrees of matching are presented to the user as correlated by their sense contextually.

Improved systems and methods are disclosed in said co-pending application Ser. No. 12/714,980 filed Mar. 1, 2010 and incorporated by reference, and involve making use of textual information regarding creation of users' profiles. Other improved systems and methods are disclosed in said co-pending application Ser. No. 12/878,675 filed Sep. 9, 2010 and also incorporated by reference, and involve preferred ways of deletion of lexical noise when creating profiles of texts. Last, said related provisional application 61/433,875, also incorporated by reference, and patent application Ser. No. 13/324,192 that claims benefit thereto, describe further improvements in which lexical noise may be deleted from search queries.

It is believed that a need still remains to improve searching and matching by sense, particularly when vast amounts of information are involved such as in Internet searches, common databases (such as DB2, Oracle, etc.), social network systems and other fields, in which explicit contextual information defining a search query or a desired match may not in itself be sufficient to provide highly efficacious processing and results.

SUMMARY OF THE DISCLOSURE

This patent disclosure describes a non-limiting example of enriching information with subtext that makes the information more suitable for efficient and accurate searching by its sense, and using such enriched information. The information can be text and/or material other than words, e.g. images, symbols and anything else that can convey information that could somehow be translated or converted into textual format. For example, an image or symbol may be related by or to a graphically similar image or symbol that is explained by text. For instance, the words of a single paragraph of a book may not convey a particular thought when read in isolation but do convey that thought when considered in light of the words of one or more other passages of the same book or even in light of the content of another book.

As a simplistic example, a sentence or a paragraph by itself may not suggest a particular emotion such as pride, anger, heightened interest, lack of interest, revulsion, or affection, but may be understood as clearly conveying such emotion in light of information from other paragraphs of sentences from the same text and/or other texts. For example, such emotions or sentiments that may not be apparent from one passage of a letter sent by a person may be gleaned from a previous letter sent by the same person, or from other information about the person or the event to which the paragraph or some other paragraphs pertains.

In turn, the pertinent information from other sentences or paragraphs may also not be explicit but rather something that can be gleaned without being stated explicitly. Or, for example, a drawing could be preceded by a chronological string of other graphical works created by the same artist, and textual description of such earlier works may be relied on to construct textual subtext for a more recent work. Or, an image in a page of a social network may be preceded and/or followed by textual information, e.g., from personal blog, that can provide a basis for associating the image with textual subtext. Therefore, the term text is used in this patent specification for simplicity and as shorthand that encompasses not only words but other material as well. Similarly, the term subtext is used to include information other than or in addition to actual words. Subtext refers to information that is not explicit in a text but is or may become something that may be gleaned from the text and/or from related text.

A subtext with context is designed to explain the true sense of a text. Context provides the textual description of present circumstances for subjects/objects; while subtext provides textual description of related to context descriptions of circumstances for the same subjects/objects.

BRIEF DESCRIPTION OF THE DRAWING

FIG. 1 is a flowchart illustrating main steps of one example of a method using principles disclosed in this patent specification.

DETAILED DESCRIPTION OF PREFERRED EMBODIMENTS

Referring to FIG. 1, an initial step 1 involves receiving and storing uploaded text. Take the simplified example of a social network enterprise that wishes to advertize to potential customers, or to have its address show in the results of an Internet search, or to match an actual customer with another customer. Of course, the enterprise would prefer to spend its advertizing budget addressing potential customers who are likely to become actual customers rather than a universe that includes many people who are unlikely to be truly interested in the particular characteristics of the enterprise. Similarly, the enterprise would like to have its Internet address show up high in the search results in response to searches by people who are more likely to be interested in that enterprise than in other social network enterprises that have different ways of doing business or different business philosophies. And, if the enterprise is working with an actual customer, the enterprise would like to be able to match that customer with other customers that are most likely to be the persons who would be a good match.

Or, an advertising agency may desire to find an image that conveys specific feelings to the exact desired audience. The agency can search for such an image in a segment of a social network if the agency knows that this is the right audience for the purpose. Images, photos, symbols, drawings, etc. in social networks often are accompanied by or associated with textual comments. If there is no text associated with a particular image, a feeling or sentiment that can be associated with that image may be deduced from textual information that precedes and/or follows the image of interest in time, e.g., in personal blogs of members of the social media of interest, where (i) explicit descriptions are comments in textual format concerning the particular image of interest and thus, if present, can help form the context of the image, and (ii) implicit descriptions are textual information that precedes and/or follows in time the image of interest and thus can help form subtext associated with the image of interest.

The term "image" as used in this specification and the appended claims is intended to include any type of pictorial or graphical information such as symbols, etc., While this patent specification from time to time refers to "images and symbols, etc.," this does not change the meaning of the term "images" as including other pictorial and graphical information.

In all of these cases, it can be impractical and/or unproductive to rely solely on explicit text of an advertisement, comments to an image or a symbol, etc., a website name or address, and/or even on the words of a search query, because they may not accurately or sufficiently fully convey implicit thoughts or emotions that are not readily apparent from the words of the text. For example, the social network enterprise may not have a sufficient advertising budget to afford skilled professionals to write advertisement texts or to do extensive market research for the right expression for an audience that the enterprise would like to impress and engage. Or, a network may not have the skill or means to discover images or symbols that convey the desired meaning or sentiment of emotion to a specific audience.

Referring to FIG. 1, which illustrates steps performed by a programmed computer system though not necessarily in the order shown, the text that is uploaded in step 1 can include, for example, a description of the enterprise and its working philosophy that is many passages long or few paragraphs long and may even be organized in chapters, parts, etc.

This text that is uploaded may include a description of different ways in which the enterprise may be viewed by likely suitable customers, it may include one or more brochures or even books that describe worldviews close to those the enterprise holds or would like to be held by its customers, character traits close to those the enterprise would like to see in its customers, or any other material suitable for the purpose. The description may be written by the enterprise, by professional writers, or by actual customers who are satisfied with the work of the enterprise or who are viewed by the enterprise as suitable or desirable customers.

For matching customers with each other, the text associated with a particular customer may include similar material but more focused to the particular traits and interests of that customer. The equipment for receiving uploaded text and for carrying out the remaining steps of the process of FIG. 1 may be similar to that described in the patent and applications incorporated by reference and/or more modern equipment incorporating computer and program advances that have become available or more widespread since then, such as wireless communication, portable or hand-held devices, cloud computing, virtual storage, etc.

In step 2 the text that was uploaded in step 1 is divided into passages and/or chapters, parts, etc., where each chapter, part, etc. typically includes several passages or paragraphs but could include only one, and in step 3 each multi-paragraph or multi-passage chapter is divided into paragraphs and/or passages. Techniques for carrying out such separation or segmentation of text are described in the patent and applications incorporated by reference here, and include but are not limited to the use of chapter headings, paragraph symbols, punctuation, grammatical rules and/or more sophisticated use of language analysis.

In step 4, the process analyses each paragraph and extract from it predicative phrases. In the example of a social network enterprise, assume that some of the text that was uploaded in step 1 includes a discussion of Ilya's family tree (where Ilya is a person's name), and that this discussion includes the following simplistic example of a paragraph: "The bloodline of Ilya grows big. The tree was good, it became big. The pedigree will be nice, the pedigree will be nice." Further assume that the process of step 4 uses the techniques described in the material incorporated by reference to extract from this paragraph the following predicative phrases:

tree-be-good-1
good-tree-good-1
be-tree-good-1
bloodline-grow big-1
Ilya-grow-big-1
pedigree-be-nice -2
it-become-big-1

The verbs are converted to a standard for this particular parsing method as in the form illustrated, and the numbers at the end of the phrases relate to the frequency at which a phrase occurs—in this case the phrase "pedigree-be-nice" occurs twice and each of the other six phrases occurs once in the sample paragraph.

In step 5, the process deletes lexical noise from the predicative phrases extracted from each of the paragraphs that were processed in step 4, using techniques and equipment such as described in said co-pending patent application Ser. No. 12/878,675 filed Sep. 9, 2010. As a result, the phrases are reduced to a more concise set, for example by eliminating redundancies and phrases that make no sense or less sense either inherently or in context. For example, the predicative phrases "good-tree-good-1" and "be-tree-good-1" are lexical noise and are eliminated in the processing of step 5.

In step 6, the process selects a paragraph or passage, for example the first paragraph that has not yet been processed through step 6, and extracts nouns from the predicative phrases derived from that paragraph, again using techniques and equipment described in the material incorporated by reference.

In step 7, a process starts that enriches that set of predicative phrases. Specifically, in step 7, the process establishes a connection to one or more thesauruses and/or dictionaries and/or other potential sources of synonyms such as encyclopedias to extract one or more synonyms for each respective one of the nouns and, optionally, other parts of speech (such as verbs, adjectives, proverbs, etc.) extracted in step 6 from the predicative phrases extracted in step 4 that has survived the culling of lexical noise in step 5.

In step 8, a cluster and/or, optionally, clusters of synonyms is created for each of the nouns and, optionally, for all other parts of speech extracted in step 6, using the connections to the content of thesauruses and/or dictionaries or other sources established in step 7. For example, the definitions and/or synonyms for the noun "tree" may include: birth, blood, bloodline, descent, extraction, family tree, genealogy, line, lineage, pedigree, stock, and strain. For instance, the definitions and/or synonyms for the verb "grow" may include: develop, mature, grow up, get bigger, get taller, become. Or, the definitions and/or synonyms for the adjective "good" may include: enjoyable, pleasant, nice, satisfactory, agreeable, lovely, and delightful In step 9, synonyms are used to create the following example of phrases that represents or expresses subtext pertaining to the paragraph or passage under consideration:

tree-be-good-1,
tree-grow-big-1
tree-be-nice-2
tree-become-big-1
Ilya-be-good-1
Ilya-grow-big-1
Ilya-be-nice-2
Ilya-become-big-1
bloodline-be-good-1,
bloodline-grow-big-1
bloodline-be-nice-2
bloodline-become-big-1
pedigree-be-good-1,
pedigree-grow-big-1
pedigree-be-nice-2
pedigree-become-big-1
it-be-good-1,
it-grow-big-1
it-be-nice-2
it-become-big-1

Each new substituting predicative phrase of the subtext for the sample paragraph or passage under consideration has the weight that the original predicative definition had before substituting.

A pronoun "it" has been inserted to create the predicative phrase "it-become-big-1." The reason for doing this is that when employing synonyms, the paragraph in question can include: "The tree was good, it became big. The pedigree will be nice!" Substituting the pronoun "it" for a noun enriches the set of predicative phrases for the sample paragraph under consideration. More details regarding substituting pronouns and proper names can be found based on the general grammatical rules and in the material incorporated by reference, including application 61/433,875 and Ser. No. 13/324,192. The addition of pronouns to subtext is not a requirement but an option.

These 20 predicative phrases are the subtext of the paragraph under consideration and are saved as metadata that pertains to the paragraph itself. Alternatively, this subtext is saved in another convenient place or another format. In addition, preferably a date associated with the creation of this subtext is saved in association with the metadata or the subtext itself, because the date can have significance in context and the underlying emotion or sentiment. For example, chocolate may be more important in subtext that was created when a paragraph pertained to a child that when this child became an adult.

This subtext constitutes (i) the subtext of words that are parts of these predicative phrases (for instance, the name "Ilya" or the verb "grow"), and/or (ii) the subtext for these predicative phrases as their integral parts (for example, a sentence that has in itself the predicative phrase "pedigree-be-nice" as its subtext may refer (if it has the right Compatibility) to the given subtext).

This subtext explains the sense of the words "Ilya" and "grow" in the present context. For instance, a computer system that has in its database the paragraph "The tree was good, it became big. The pedigree will be nice!" and the paragraph's subtext as a part of, for example, Ilya's profile, can come across some texts in which the name "Ilya" occurs. As a simple example, that computer is likely to associate that new text with other text that deals with a family tree than with food preferences because based on the principles described above that computer has deduced that Ilya is presumably interested in a family tree.

Or, as another example, if a user searches using the query "Ilya is a nice guy: he may have a lot of children, couldn't he?"—the user may get the answer: "The pedigree will be nice!"—because there is a relation between the paragraphs "The tree was good, it became big. The pedigree will be nice!" and "The bloodline of Ilya grows big. The tree was good, it became big. The pedigree will be nice, the pedigree will be nice." Therefore, the sentence "The pedigree will be nice!" may provide the highest Compatibility toward the search request "Ilya is a nice guy: he may have a lot of children, couldn't he?" In addition, a time reference such as the time a passage was created, can be associated with the passage, and treated in a way similar to the treatment of predicative phrases.

Step 10 is a test whether the paragraph that was processed in the preceding steps was the last paragraph to be considered. If the answer is NO, the process returns to step 6 to commence processing another paragraph, such as the immediately following paragraph of the text uploaded in step 1. If the answer is YES, the process continues to step 11.

In step 11, the process determines compatibility. In one example, this step may test for compatibility between (i) a paragraph and its neighbors, for example one or more preceding paragraphs and one or more succeeding paragraphs in one text, and (ii) a paragraph and it neighbors in another text. However, this step may test for compatibility between (i) one paragraphs in one text, and (ii) another paragraph in the same text. Similar compatibility tests can be performed by comparing one paragraph (and possibly surrounding text) with another paragraph (and possibly surrounding text) in the same body of text, e.g., in the same book or the same brochure.

The paragraphs that precede and follow each of the paragraphs that are tested for compatibility are preferably defined as being at least 200 words long. Other lengths are also contemplated herein. Therefore, for example, if the given paragraph—"The bloodline of Ilya grows big. The tree was good, it became big. The pedigree will be nice, the pedigree will be nice."—is preceded by a paragraph that is less than 200 words, then the computer system preferably considers further preceding paragraphs, until the number of words within the preceding paragraphs equals or is greater than 200 words. Thus, if the paragraph—"The bloodline of Ilya grows big. The tree was good, it became big. The pedigree will be nice, the pedigree will be nice."—is in the middle of a chapter, it will be preceded and followed by at least 200 words, and if the given paragraph is first or last paragraph it will be followed or preceded by at least 400 words, respectively. It should be noted that this patent specification is not be limited to any specific number of words or paragraphs the profiles of which are compared to the profile of the given paragraph. These surrounding paragraphs should be matched for the paragraphs that are tested for compatibility in this step 11.

Assume as an example that the social network enterprise has created advertising text that includes, as one of many paragraphs, the paragraph "The family tree should be good for a good family." and further assume that there is a text created by a potential customer that includes, again as one of several paragraphs, the paragraph "The bloodline of Ilya grows big. The tree was good, it became big. The pedigree will be nice, the pedigree will be nice." The test in step 11 can involve comparing the profile of one of these two paragraphs and preferably its neighborhood with that of the other and preferably its neighborhood, as described in said application Ser. No. 13/324,192 filed Dec. 13, 2011. Note that the profile of a paragraph generally is not the subtext of the paragraph derived as described above in connection with step 9 but can be, and typically is, the set of initially extracted predicative phrases. For example, the profile of the paragraph "The bloodline of Ilya grows big. The tree was good, it became big. The pedigree will be nice, the pedigree will be nice." may be, after deletion of lexical noise, only the five predicative phrases:

tree-be-good-1,
bloodline-grow-big-1
Ilya-grow-big-1
pedigree-be-nice-0.5
it-become-big-1.

The threshold of a degree of compatibility that is acceptable to a particular advertiser and/or for a particular purpose is established by choice or empirically, and related to the degree of match between the profiles, e.g., the number of identical predicative phrases of at least similar predicative phrases. Preferably a numerical threshold of acceptable degree of compatibility is established.

Step 13 is a test whether the compatibility of the two paragraphs and their neighborhoods under consideration exceeds, or is no less than, a threshold. One exemplary method of determining compatibility between the profiles of the two texts (text1 and text2), e.g. of two paragraphs (and surrounding text), that are being tested for compatibility may be based upon a compatibility algorithm, such as:

$$\text{Compatibility} * \left( \frac{\text{Sum(Weight-same-phrases-}text_1 * \text{Weight-same-phrases-}text_2)}{Sqrt(\text{Sum(Weight-same-phrases-}text_1)^2 * (\text{Weight-same-phrase-}text_2)^2)} \right)$$

where the weight refers to the frequency that a context phrase occurs in text1 in relation to text2 context phrases.

If the answer in step 13 is NO, this means that the two paragraphs are not compatible for the current purposes, and the process returns to step 11 to test for compatibility between the paragraph under consideration and another paragraph. If the answer is YES, this means that the two paragraphs and their surrounding text that were tested for compatibility indeed should be associated, despite the fact that they differ in wording from each other. For example, if the shorter paragraph "The family tree should be good for a good family" is a part of advertising text, this particular paragraph should be included in advertising targeted to a potential customer whose sentiment regarding the importance of a family tree are suggested by the subtext extracted from the longer paragraph "The bloodline of Ilya grows big. The tree was good, it became big. The pedigree will be nice, the pedigree will be nice." Other paragraphs in the advertisement may be less relevant to this particular potential customer and need not be included in a presentation to that customer or may be presented only as background. If the passage/paragraph "The family tree should be good for a good family." is used as a search query for the system and method established into said application Ser. No. 13/324,192, the search would find the paragraph "The bloodline of Ilya grows big. The tree was good, it became big. The pedigree will be nice, the pedigree will be nice." The index between related passages by subtexts is established: the paragraph under consideration—"The family tree should be good for a good family" is thematically, by its sense, related/attached/tied to the paragraph "The bloodline of Ilya grows big. The tree was good, it became big. The pedigree will be nice, the pedigree will be nice." This means that finding the paragraph "The family tree should be good for a good family" a user also, at the same time, finds by subtexts all thematically, by sense, related texts and/or their passages and/or paragraphs into the database. It also means that the word "family" will be—subtextually—associated with words "Ilya", "tree", "pedigree", "grow", "big" and all these 20 predicative definitions at any place (if there is the right Compatibility):

tree-be-good-1,
tree-grow-big-1
tree-be-nice-2
tree-become-big-1
Ilya-be-good-1
Ilya-grow-big-1
Ilya-be-nice-2
Ilya-become-big-1
bloodline-be-good-1,
bloodline-grow-big-1
bloodline-be-nice-2
bloodline-become-big-1
pedigree-be-good-1,
pedigree-grow-big-1
pedigree-be-nice-2
pedigree-become-big-1
it-be-good-1,
it-grow-big-1
it-be-nice-2
it-become-big-1

By selecting or changing the value of Compatibility, one could find less important or more important related passages/paragraphs in the database. If Compatibility=100%–most likely only absolutely identical paragraphs/passages can be found. If Compatibility=0%–all paragraphs/passages that have even one same word and/or predicative definition are found. Therefore, the extent by which the results relate to the query by subtexts is governed by Compatibility.

Text that accompanies images, symbols, etc. can constitute subtexts of images, symbols, etc. that are in some way similar. Images, symbols, etc. can be searched by their subtexts and their graphical similarity; where standard analytic programs are used for identifying graphical similarity between images, drawings, etc.

If the answer in step 13 is YES, the process moves to step 14.

In step 14, the process adds the subtext that was created for the paragraph or image or symbol, etc. under consideration, and a date of creation, as metadata (or some other information in some other format) associated with the paragraph, etc. that meets the compatibility test. For example, the subtext extracted from the longer paragraph is added as metadata to the shorter paragraph "The family tree should be good for a good family," creating the subtextual relation or index between these texts and/or passages and/or the texts' chapters, parts, etc. and/or their paragraphs. For instance, the subtext for one similar graphically image is added to another image. Or, the subtext for one graphically similar symbol is added to another symbol.

Step 15 is a test whether the last pair of paragraphs (or text describing images, symbols, etc.) and surrounding text was tested for compatibility. If the answer is NO, the process returns to step 11 to test another pair of paragraphs for compatibility. If the answer is YES, the process moves to step 16.

In step 16, the subtext created for each paragraph under consideration, and the date of creation, are finalized and stored in association with the respective paragraphs in any suitable place or format.

Subtexts could be used for the establishing relationships between parts of one text and between many different texts. For instance, if there is a first book on the philosophy of Plato all other books that pertain to that philosophy may be related to the first book by subtexts. Indeed, after matching paragraphs and their surrounding paragraphs of these many books to the first paragraphs, this creates a new kind of relational-by-subtext database in which subtexts constitute the relational tree by sense.

In certain embodiments, when extracting predicative phrases, the system may be configured to control for common noun phrases, idioms, or similar phrases. For example, "hot dog" may be treated as a noun, as opposed to a noun plus an adjective. Additionally, idioms such as "under the weather" may be treated as a single adjective. These common noun phrases, idioms, or similar phrases could also be substituted by texts, which texts explain their meanings into taken from the database of common phrases or idioms, encyclopedia or dictionary, etc. textual descriptions. Consider for example the sentence: "I love hot dogs because they are tasty." After the program obtains a definition from a dictionary for "hot dog" as "a frankfurter heated and served in a long split roll"—the program rewrites the sentence—"I love hot dogs, frankfurters heated and served in a long split roll, because they are tasty." Therefore, the phrase "hot dog" in the first clause may be taken as two words—noun-verb-adjective "hot" and noun-verb "dog". However, two words "hot dog" could be ignored and the profile made for the rewritten sentence "I love frankfurters heated and served in a long split roll because they are tasty", without the words "hot" and "dog" at all. These noun phrases and idioms may be identified based upon the database of common phrases or idioms, but the system is not limited to any specific way of identifying them. Furthermore, in certain embodiments both the "noun phrases" and their components may be used to form predicative definitions, while in other embodiments they are mutually exclusive.

It should be appreciated that while specific examples are described in this patent specification, they are not the only examples of the invention to which this patent specification is directed and are simply illustrative of the principles that can be applied in other examples and implementations of the invented process and system. It should also be appreciated that this patent specification describes a process that a person of ordinary skill in computer programming can implement as a computer program that when loaded into a computer system would cause the system to carry out the described process.

The invention claimed is:

1. A method of automatically creating subtext and using subtext to associate textual information regarding text and/or images by sense thereof, said method being carried out by a programmed computer system and comprising the following steps that the computer system need not execute in the stated order:
   (a) receiving textual information into computer storage and dividing the textual information into passages;
   (b) extracting predicative phrases from a passage of said textual information;
   (c) deleting lexical noise from the passage;
   (d) extracting nouns from the predicative phrases;
   (e) creating one or more clusters of synonyms for said nouns;
   (f) creating subtext comprising an enhanced set of predicative phrases for said passage from said nouns and said one or more clusters of synonyms;
   (g) subjecting each of a sequence of other passages of the received textual information to steps (b) through (f) to thereby create respective subtext for the respective passages;
   (h) testing respective subtexts for compatibility in accordance with a selected compatibility relationship; and
   (i) associating passages with each other based on results of said testing for compatibility of their respective subtexts.

2. The method of claim 1 said testing for compatibility comprises selecting a compatibility threshold.

3. The method of claim 1 in which at least one of the passages comprises a search query.

4. The method of claim 1 in which step (d) timber comprises extracting other parts of speech, including one or more of verbs, adjectives, idiomatic expressions, and proverbs from the predicative phrases, step (e) further includes creating one or more clusters of synonyms for said other parts of speech, and step (e) further comprises creating subtext comprising an enhanced set of predicative phrases for said passage from said other parts of speech and clusters of synonym thereof.

5. The method of claim 4 in which said creating one or more clusters of synonyms of nouns and other parts of speech comprises accessing compilations of synonyms by using the extracted nouns and other parts of speech as search terms.

6. The method of claim 1 in which said extracting of predicative phrases further comprises assigning thereto information regarding frequency of occurrence of the respective predicative phrases.

7. The method of claim 1 in which said associating comprises associating passages with each other based on whether said testing for compatibility determines a compatibility value that meets a selected threshold.

8. The method of claim 1 in which said creating one or more clusters of synonyms comprises accessing compilations of synonyms by using the extracted nouns as search terms.

9. A computer system programmed and configured to automatically create subtext and use subtext to associate textual information regarding text and/or images by sense thereof, comprising:
   (a) a computer implemented facility configured to receive textual information into computer storage and divide the textual information into passages;
   (b) a computer implemented facility configured to extract predicative phrases from a passage of said textual information;
   (c) a computer implemented facility configured to delete lexical noise from the passage;
   (d) a computer implemented facility configured to extract nouns from the predicative phrases;
   (e) a computer implemented facility configured to create one or more clusters of synonyms for said nouns;
   (f) a computer implemented facility configured to create subtext comprising an enhanced set of predicative phrases for said passage from said nouns and said one or more clusters of synonyms;
   (g) a computer implemented facility configured to subject each of a sequence of other passages of the received textual information to the facilities (b) through (f) to thereby create respective subtext for the respective passages;
   (h) a computer implemented facility configured to test respective subtexts for compatibility with each other in accordance with a selected compatibility relationship; and
   (i) a computer implemented facility configured to associate passages with each other based on results of said testing for compatibility of their respective subtexts.

10. The computer system of claim 9 in which said facility configured to test respective subtexts for compatibility is further configured to select a compatibility threshold and use said threshold to determine whether the tested subtexts are compatible.

11. The computer system of claim 9 in which at least one of the passages comprises a search query and wherein the system further comprises a search facility using said query to find passages compatible therewith by sense.

12. The computer system of claim 9 in which facility (d) further includes a facility configured to extract parts of speech other than nouns from the predicative phases, facility (e) further includes a facility creating one or more clusters of synonyms for said other parts of speech, and facility (f) further includes a facility creating subtext comprising an enhanced set of predicative phrases for said passage from said other parts of speech and clusters of synonym thereof.

13. The computer system of claim 9 in which said facility configured to extract predicative phrases is further configured to assign to the predicative phrases information regarding frequency of occurrence of the respective predicative phrases.

14. The computer system of claim 9 in which said facility configured to extract predicative phrases is further configured to assign to the subtexts information regarding the date of their origin.

15. The computer system of claim 9 in which said facility configured to associate passages is further configured to associate said passages based at least in part on whether said testing for compatibility determines a compatibility value that meets a selected threshold.

16. A computer program stored in a non-transitory form in a computer-readable medium and executable in a computer system to cause the system to automatically create subtext and use subtext to associate textual information regarding text and/or images by sense thereof by carrying out a process comprising the following steps that need not be executed in the stated order:
   (a) receiving textual information into computer storage and dividing the textual information into passages;
   (b) extracting predicative phrases from a passage of said textual information;
   (c) deleting lexical noise from the passage;
   (d) extracting nouns from the predicative phrases;
   (e) creating one or more clusters of synonyms for said nouns;

(f) creating subtext comprising an enhanced set of predicative phrases for said passage from said nouns and said one or more clusters of synonyms;

(g) subjecting each of a sequence of other passages of the received textual information to steps (b) through (f) to thereby create respective subtext for the respective passages;

(h) testing respective subtexts for compatibility in accordance with a selected compatibility relationship; and (i) associating passages with each other based on results of said testing for compatibility of their respective subtexts.

17. The computer program of claim 16 further comprising instructions stored in non-transitory form in said computer-readable medium that, when executed in said computer system, cause the system to further include in step (d) extracting other parts of speech, from the predicative phrases, to further include in step (e) creating one or more clusters of synonyms for said other parts of speech, and to further include in step (e) creating subtext comprising an enhanced set of predicative phrases for said passage from said other parts of speech and clusters of synonym thereof.

* * * * *